United States Patent [19]
Lewers

[11] 3,788,390
[45] Jan. 29, 1974

[54] EMERGENCY MASTER CONTROL VALVE

[75] Inventor: William G. Lewers, Chincoteague, Va.

[73] Assignee: The United States of America as represented by the Administrator of the National Aeronautics and Space Administration, Washington, D.C.

[22] Filed: Dec. 8, 1972

[21] Appl. No.: 313,390

[52] U.S. Cl................ 165/74, 137/601, 137/625.32
[51] Int. Cl.............................................. F28d 1/06
[58] Field of Search..137/340, 375, 601, 609, 625.32, 137/625.47, 256; 165/76, 74, 97

[56] References Cited
UNITED STATES PATENTS

| | | | |
|---|---|---|---|
| 1,823,935 | 9/1931 | George | 137/609 |
| 2,046,569 | 7/1936 | Madorin | 165/74 |
| 2,980,172 | 4/1961 | Thompson | 165/74 |
| 3,390,719 | 7/1968 | McCallister | 165/97 |

Primary Examiner—Manuel A. Antonakas
Assistant Examiner—Theophil W. Streule, Jr.
Attorney, Agent, or Firm—Howard J. Osborn et al.

[57] ABSTRACT

An improved tank heater for lowering the viscosity of liquids stored in tanks and for isolating the liquid such that the tank heater coils can be removed and repaired without having to drain the tank.

This improved tank heater has advantages over prior tank heaters in that it is mechanically simpler to build and operate and allows heating coil repairs to be performed without having to drain the tank in which the steam coil is located.

10 Claims, 6 Drawing Figures

EMERGENCY MASTER CONTROL VALVE

ORIGIN OF THE INVENTION

This invention was made by an employee of the National Aeronautics and Space Administration and may be manufactured and used by or for the government for governmental purposes without the payment of any royalties thereon or therefor.

BACKGROUND OF THE INVENTION

The invention relates generally to a tank heater for lowering the viscosity of highly viscous liquids stored in tanks and more specifically to a system for controlling flow into the heater and for readily removing and servicing the apparatus without having to drain the tanks.

Viscous liquids stored in tanks are so resistant to flow at low temperatures that it is difficult to handle them with ordinary pumping. Raising the temperature of the liquid serves to lower its viscosity and allows it to be pumped more readily. Conventional tank heaters designed to raise the temperature of viscous liquids stored in tanks usually include sets of steam coils mounted inside open cylinders attached to the tanks.

Discharge tubes are attached to the end of the cylinders and extend through the tank walls. Viscous liquids enter the cylinders, are heated as they pass over the steam coils to flow freely to discharge tubes and are pumped to their destination.

The problems of current tank heating apparatus arise when the heater requires periodic repair and maintenance. The two major difficulties involve removal of the heater and isolation of the liquid during removal such that draining of the tank is not required. Prior art solutions to these problems are overly complex mechanically, especially in the structure for liquid isolation and for heater removal. Therefore, there is a definite need in the art for an improved tank heater which has less mechanical complexity and has features which make it more versatile.

Accordingly, it is an object of the present invention to provide an improved tank heater in which heater removal and servicing are more readily accomplished.

Another object of the present invention is to provide an improved system for isolating liquids stored inside tanks.

SUMMARY

The improved tank heater of the present invention consists essentially of one or more upper and one lower inter-connected cylinders mounted on a flange introduced into the side of a tank containing a viscous liquid. Each upper cylinder has inlets formed in one surface, contains a shaft on which webs with arcuate closure shoes are mounted, and is closed on the ends.

The lower cylinder contains a steam coil, is closed on the inner end and has a discharge tube attached to the outer end.

Viscous liquid enters the inlets formed in the upper cylinders, flows to the lower cylinder through apparatus connecting the cylinders and flows over the steam coil to the discharge tube. The heated liquid has a lower viscosity than the stored liquid and is readily pumped to its destination.

When the steam coil requires servicing, the shaft in each upper cylinder is rotated 90° thereby revolving the shoes therein such that they block and seal the upper cylinder inlets and the cylinder connecting means. While the inlets and connections are sealed, the steam coil is withdrawn from the lower cylinder for the necessary maintenance. Sealing the upper cylinder and connections such that the stored fluid is prevented from leaking into the lower cylinder allows the outer end of the lower cylinder to be used as an access to the steam coil without having to drain the tank.

Alternately, the upper cylinder structure is replaced by a cam shaft and port cover assembly mounted on the outside of the lower cylinder such that the port covers are alined with the lower cylinder ports. While the steam coil is operating, the port covers are in the open position and liquid flow proceeds normally through the lower cylinder to the discharge tube. When the coil requires servicing, however, the cam shaft is turned thereby permitting spring biasing of the port covers into contact with the ports to seal them. While the ports are sealed, liquid is prevented from leaking into the lower cylinder and repairs can progress normally.

The improved tank heater has advantages over prior tank heaters in that it is mechanically simpler to build and operate and allows steam coil repairs to be performed without having to drain the tank in which the steam coil is located.

BRIEF DESCRIPTION OF THE DRAWINGS

A more complete appreciation of the present invention and many of the attendant advantages thereof will be readily apparent as the same becomes better understood by reference to the following detailed description when considered in connection with the accompanying drawings wherein.

DETAILED DESCRIPTION

Figure 1:
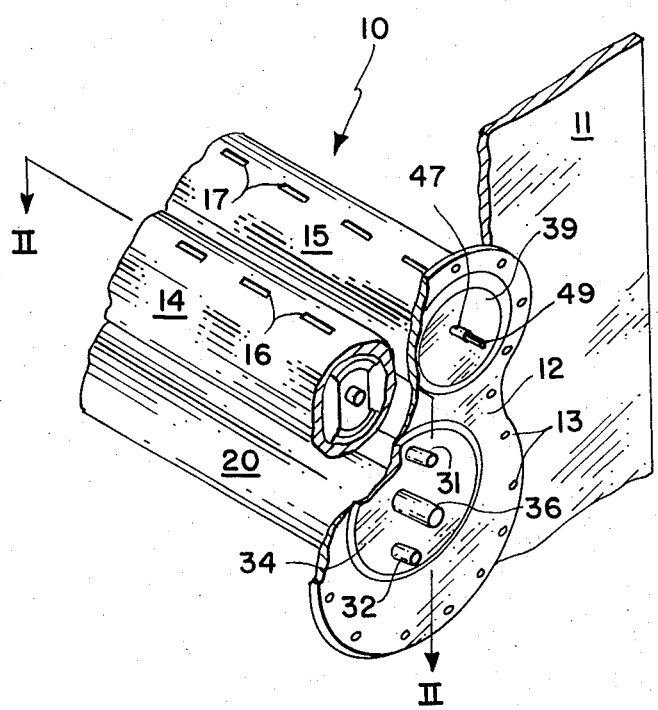
FIG. 1 is a view of one embodiment of the tank heater of the present invention showing the relationship of the major components thereof within a viscous liquid tank with parts therein broken away.
Figure 2:
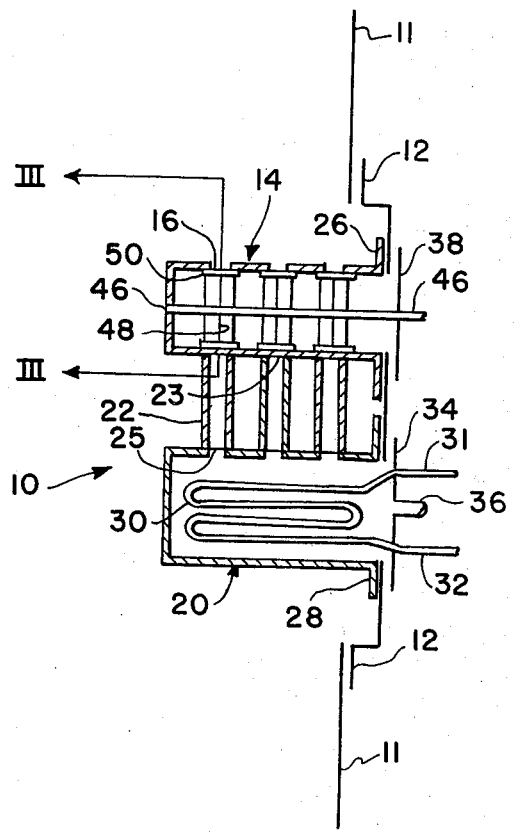
FIG. 2 is a view taken along lines II—II of FIG. 1 with parts schematically shown.

Referring now to the drawings wherein like reference numerals refer to like parts throughout the several views, and more particularly to FIGS. 1 and 2, there is shown oe embodiment of the tank heater assembly of the present invention, generally designated by reference numeral 10, secured to the interior of a suitable viscous fluid containing storage tank 11.

An exterior flange 12 serves to secure heater assembly 10 within tank 11 by way of rivets or bolts 13.

Tank heater 10 includes one or more upper tubular cylinders, two of which are shown in the illustrated embodiment and designated by reference numerals 14 and 15. Each upper cylinder is provided with a row of inlets as designated, respectively, by reference numerals 16 and 17 along the upper surface thereof. As shown in FIG. 2, inlets 16 of tubular cylinder 14 communicate with a lower tubular heating cylinder 20 through hollow tubes 22 extending from ports 23 formed in cylinder 14 to ports 25 formed in heating cylinder 20. Each of cylinders 14, 15 and 20 are sealed at one end thereof with the other end being open and flanged. The flange on cylinder 14 is designated by reference numeral 26, and that on cylinder 20 by reference numeral 28. The flange on cylinder 15 is not shown in the interest of clarity, it being understood that all components of cylinders 14 and 15 are identical in all respects. The flanged ends of cylinders 14, 15 and 20 are sealingly mounted onto the inner surface of apertures formed in flange 12 by suitable bolts or the like and cover plates, as will be further explained hereinafter, in a conventional manner. Flange 12 is mounted on liquid storage tank 11 about a suitable aperture therein such that the closed ends of the cylinders extend through the aperture within tank 11.

A suitable heater element, such for example, a steam coil 30 is slidably received by heating cylinder 20 and is provided with a suitable steam inlet 31 and steam outlet 32 extending therefrom through a cover plate 34. A suitable discharge conduit 36 is provided integral with cover plate 34 to permit pumping of the liquid from heater cylinder 20 as the viscosity of the liquid is lowered to a suitable value.

Suitable upper cover plates are also provided for cylinders 14 and 15 as designated, respectively, by reference numerals 38 and 39 and serve to hermetically seal cylinders 14 and 15 to flange 12.

Figure 3:
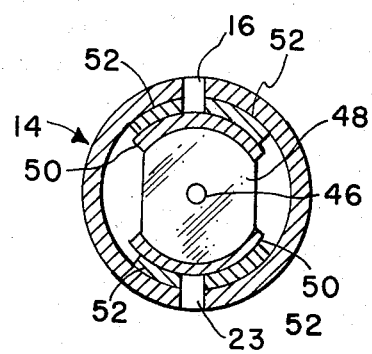
FIG. 3 is a view taken along lines III—III of FIG. 2.
Figure 4:
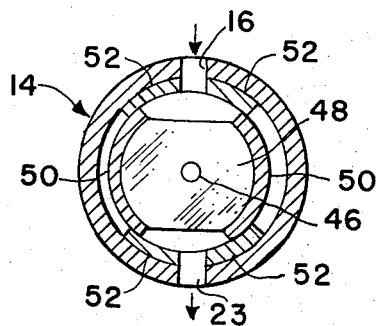
FIG. 4 is a view similar to FIG. 3 showing the cylinder elements after the control shaft has been rotated 90° to open the through-channels.

Referring now more particularly to FIGS. 3 and 4, it is seen that a central shaft 46 extends along the length of cylinder 14 through cover plate 38. A plurality of webs 48, each supporting a pair of arcuate shoes 50 are integrally secured in spaced relationship along the length of shaft 46. Arcuate spacers 52 are affixed to the inner wall of cylinder 14 and surround inlets 16 and ports 23 so as to form a leakproof seal with shoes 50 when the shoes are positioned as shown in FIG. 3. In this position no liquid can flow from tank 11 into the heater assembly 10. Upon 90° rotation of shaft 46, inlets 16 and ports 23 are opened to permit liquid flow as shown in FIG. 4. Shaft 46 is provided with flat sides at the end thereof exposed through cover plate 38 to facilitate turning thereof by a spanner wrench or the like. This structure is more clearly illustrated in FIG. 1 wherein shaft 47 for cylinder 15 is shown having flat surfaces 49 at the exposed end thereof.

When steam coil 30 requires replacement or repair, shafts 46 and 47 are rotated 90° to rotate shoes 50 in cylinder 14 and those in cylinder 15, not shown, to the blocking position shown in FIG. 3. In this position, no liquid can enter heater cylinder 20. Cover plate 34 may then be removed without substantial loss of liquid and steam coil 30 withdrawn through flange 12. Also, a second valve cylinder 14 may be added to the bottom of cylinder 20 to convert unit 10 to a heat exchanger by reversing the liquid flow to gravity within the tank. When all valve cylinders are shut off to secure the flow of liquid to the tank, the fill line master valve can be replaced or repaired as necessary without difficulty.

Figure 5:
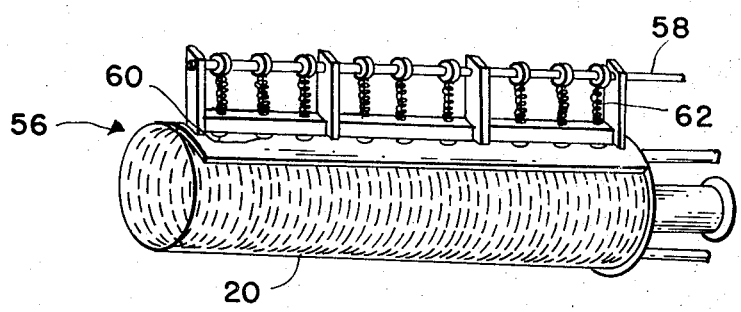
FIG. 5 is a view of an alternate embodiment of the tank heater assembly of the present invention.

A second embodiment of the tank heater assembly of the present invention is shown in FIG. 5 and generally designated by reference numeral 56 wherein the upper cylinder structure in the previously described embodiment have been replaced by a cam shaft assembly. Cam shaft 58, having spring-loaded valves 60 attached thereto, is mounted on the outside surface of lower heater cylinder 20 such that valve covers 60 are alined with lower cylinder ports 25. When cam shaft 58 is turned, valve covers 60 move into contact with lower cylinder 20 and serve to block ports 25. Springs 62, disposed about the stem of valve covers 60 and abutting cam shaft 58, serve to bias valve covers 60 tightly seated with ports 25 thereby forming a leakproof seal. When valve covers 60 seal lower cylinder ports 25 such that a leakproof seal is formed, liquid is prevented from entering lower cylinder 20. When steam coil 30 requires replacement or repairs, cam shaft 58 is turned approximately 90° to release springs 62 and cause valve covers 60 to seal lower cylinder ports 25. Steam coil 30 is then withdrawn from lower cylinder 20 through the primary opening formed in lower cover plate 34. As long as valve covers 60 seal lower cylinder ports 25, no liquid can leak from the tank into the heater apparatus and no liquid will be lost. Reverse rotation of cam shaft 58 presses valve covers 60 out of seating engagement and opens the ports 25.

Figure 6:
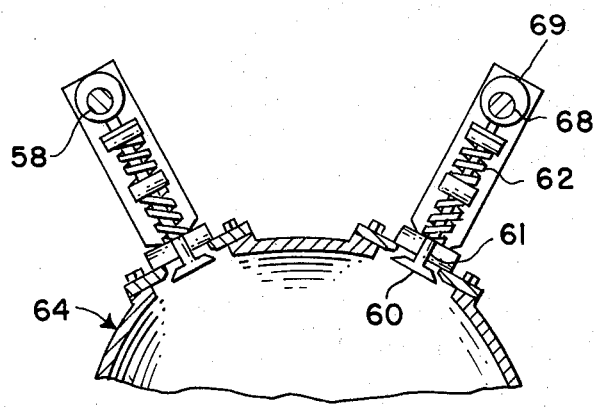
FIG. 6 is a view of another modification of the embodiment shown in FIG. 5.

Another embodiment of the tank heat assembly of the present invention is shown in FIG. 6 and generally designated by reference numeral 64. In this embodiment a second row of inlets is formed in upper cylinder 20 and a second cam shaft 68 and cam portions 59 are mounted thereon. As shown therein, valve covers 60 are provided with integral stem portions 61 about which are disposed springs 62 for normally maintaining valve cover 60 seated.

In a specific application of the present invention a bulk fuel oil storage tank having a fuel capacity of 125,000 gallons was fitted with a tank heater utilizing a steam coil, seven feet in length. Steam heating of fuel oil of this type to approximately 170°F. is required before the oil can be readily pumped. Prior to the present invention when replacement or repair of the steam coils was required the entire tank had to be drained with the oil being wasted. Using the present invention, it is possible to isolate the stored oil from the steam coil heater to permit removal of the coil from the tank without the time-consuming and costly operation of draining the tank.

Although the invention has been described relative to specific embodiments thereof, it is not so limited and the described specific example is for illustration of the principle only and is not intended to serve as a limitation thereof. For example, tubes 22 may be omitted and the upper cylinder(s) connected to heating cylinder 20 by way of suitable flanges formed integral therewith. In this case flat adapter plates would be integrally formed on the flanges of each of the cylinders and adapted to be bolted together in hermetically sealed relationship so as to form a flanged well between the cylinders. Also, the invention is readily applicable for use in reducing the viscosity of any stored liquid and may find utility in milk tanks, molasses, or any other containers of liquid where it is desired to lower the liquid viscosity. These and other modifications and variations of the specific embodiments described will be readily apparent to those skilled in the art in light of the above teachings. It is therefore to be understood that within the scope of the appended claims, the invention may be practiced otherwise than as specifically described herein.

What is claimed as new and desired to be secured by Letters Patent of the United States is:

1. A heater assembly for heating incremental portions a liquid to reduce the viscosity thereof and thereby facilitate liquid flow comprising:

a perforated housing and removable heating coils disposed in said housing, said heater assembly being adapted for insertion within and secured to the wall of a liquid tank with said perforated housing being provided with outlet means that extend exterior of the tank, closure means disposed exteriorly adjacent to said perforated housing for selectively moving from an open to a closed position for opening and closing said perforated housing to thereby control liquid flow from the tank into said perforated housing, selector means integrally attached to said closure means and adapted to extend through the tank wall for selectively actuating said closure means, and flange means, adapted to be secured to the tank to retain the heater assembly therein and to permit access to said heating coils for replacement thereof when so desired without the loss of liquid from the tank.

2. The heater assembly as in claim 1 wherein said perforated housing is cylindrical in form and provided with a linear row of openings therethrough to permit entry of viscous liquid and said closure means includes a tubular cylinder disposed adjacent said perforated housing and having a first row of openings therethrough coinciding in shape, size and number to the linear row of openings in said perforated housing and a second row of openings diametrically opposed to said first row of openings also extending through said tubular cylinder, and wherein said closure means when in said closed position effects closure of each said row of openings to prevent liquid entry into said tubular cylinder and said perforated housing and when in said open position effects opening of each said row of openings to permit liquid flow through said tubular cylinder into said perforated housing.

3. The heater assembly as in claim 2 wherein said closure means includes a plurality of pairs of arcuately shaped shoes serving to open and hermetically seal said rows of openings in said tubular cylinder.

4. The heater assembly of claim 3 wherein each said pair of arcuately shaped shoes are connected to support webs integrally attached to a shaft extending along the central axis of said tubular cylinder.

5. The heater assembly of claim 4 wherein said shaft extends from the end of said tubular cylinder and serves as said selector means.

6. The heater assembly of claim 1 wherein said perforated housng is cylindrical in form and the perforations therein are formed in a linear row of openings and a plurality of valve covers are seated one each in each member of the row with each said valve cover including an integral stem extending exterior of said perforated housing and spring biasing means normally maintaining said valve covers seated so as to hermetically close said row of openings.

7. The heater assembly of claim 6 wherein said selector means includes a linear cam shaft disposed adjacent each said valve cover stem and serving, when rotated a predetermined angle, to overcome the spring pressure on each said valve cover to uncover the row of openings in said perforated housing to thereby permit liquid entry therein.

8. The heater assembly of claim 7 including at least a pair of linear rows of openings in said perforated housing and at least a pair of cam shafts for effecting unseating of the pair of rows of valve covers serving to hermetically seal each opening.

9. In combination, a tank containing a viscous fluid with outlet means provided therein for removal of the fluid and a heater assembly for heating incremental portions of the fluid to reduce the viscosity thereof and thereby facilitate fluid flow through said outlet means, the improvement therewith comprising:

a heater assembly having a perforated housing and containing heating coils in said housing, said heater assembly being disposed within and secured to the wall of said tank with said perforated housing being in fluid communication with said outlet means;

closure means disposed within said tank exteriorly adjacent to said perforated housing for selectively opening and closing said perforated housing to thereby control fluid flow from said tank into said perforated housing, selector means integrally attached to said closure means and extending through said tank wall for selectively actuating said closure means, and access means secured to said tank to permit access to said heating coils for replacement thereof when so desired without the loss of fluid from said tank.

10. In a tank adapted for storing viscous liquids and provided with a heater for reducing the viscosity of incremental portions of the fluid to permit flow thereof through a suitable outlet, the improvement therewith comprising:

a flange, having upper and lower apertures therein, connected to the exterior of said tank such that said flange covers an opening formed in the side of said tank;

a tubular well chamber, having one closed end and one flanged end, said flanged end connected in sealed relationship to the interior of said flange and alined with said lower aperture therein, said closed end thereof extending into said tank;

removable heating means disposed within said tubular well chamber;

inlet and outlet conduits extending from said removable heating means;

a tubular well chamber cover plate having one primary and two secondary openings therein, connected to said flange such that said primary opening is alined with said lower aperture therein;

said inlet and outlet conduits extending from said removable heating means through said two secondary openings in said tubular well chamber cover plate;

an open discharge tube connected to said tubular well chamber cover plate and alined with said primary opening therein;

said tubular well chamber having a row of inlets formed in the upper surface thereof;

a tubular valve chamber, having one closed end and one flanged end, said flanged end thereof connected in sealed relationship to the interior of said exterior flange and alined with said upper aperture such that said closed end thereof extends into said tank;

said tubular valve chamber having a row of inlets in the upper surface thereof and a row of outlets in the lower surface thereof; flow sleeves connecting said tubular well chamber inlets with said tubular valve chamber outlets wherein said flow sleeves are hermetically sealed;

a tubular valve chamber cover plate having an opening therein connected to the exterior of said exterior flange such that said tubular valve chamber cover plate opening is alined with said upper aperture;

a movable shaft disposed within said tubular valve chamber;

said movable shaft extending from said closed end of said tubular valve chamber through said opening formed in said tubular valve chamber cover plate;

a plurality of support webs circumferentially mounted on said movable shaft and alined between said tubular valve chamber inlets and outlets;

a plurality of arcuately shaped shoes mounted on said support webs wherein said shoes and said support webs form through-channels between said tubular valve chamber inlets and outlets;

a plurality of spacers surrounding said tubular valve chamber inlets and outlets;

said shoes and support webs being movable into first and seond positions within said tubular valve chamber;

said first position thereby serving to prevent all liquid communication between said tubular valve chamber inlets and outlets wherein said shoes in said first position serve to block said tubular valve chamber inlets and outlets and wherein said spacers serve to form a loakproof seal with said shoes around said tubular valve chamber inlets and outlets; and when said shoes are in said second position, said viscous liquid enters said tubular valve chamber, flows through said flow sleeves into said tubular well chamber, and passes over said heating means disposed therein;

said second position thereby serving to provide direct communication between tubular valve chamber inlets and outlets wherein said through-channels are alined between said tubular valve chamber inlets and outlets;

whereby the viscosity of said liquid moving over said removable heating means is reduced and said liquid flows readily to said discharge tube and may be pumped to the destination thereof; and whereby said tubular valve chamber cover plate is removable such that said movable shaft, support webs and shoes are accessible for repairs; and when said shoes and said support webs are in said first position said tubular well chamber cover plate is removable such that said removable heating means is accessible for repairs, and such that no liquid leaks into said tubular well chamber.

* * * * *

PO-1050
(5/69)

UNITED STATES PATENT OFFICE
CERTIFICATE OF CORRECTION

Patent No. 3,788,390            Dated January 29, 1974

Inventor(s)  William G. Lewers

It is certified that error appears in the above-identified patent and that said Letters Patent are hereby corrected as shown below:

Column 2, line 54, "oe" should read --one--.
Column 5, line 2, before "a" insert --of--;

Column 7, line 25, correct the spelling of "second".
Column 8, line 4, correct the spelling of "leakproof".

Signed and Sealed this third Day of February 1976

[SEAL]

Attest:

RUTH C. MASON
Attesting Officer

C. MARSHALL DANN
Commissioner of Patents and Trademarks